United States Patent

Hart et al.

(10) Patent No.: US 10,142,213 B1
(45) Date of Patent: Nov. 27, 2018

(54) TECHNIQUES FOR PROVIDING EVENT DRIVEN NOTIFICATIONS

(71) Applicant: Symantec Corporation, Mountain View, CA (US)

(72) Inventors: Michael Hart, Farmington, CT (US); Darren Shou, La Jolla, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 716 days.

(21) Appl. No.: 14/492,960

(22) Filed: Sep. 22, 2014

(51) Int. Cl.
- *G06F 15/173* (2006.01)
- *H04L 12/26* (2006.01)
- *H04L 29/08* (2006.01)

(52) U.S. Cl.
CPC .............. *H04L 43/10* (2013.01); *H04L 67/18* (2013.01)

(58) Field of Classification Search
CPC ................................ H04L 43/10; H04L 67/18
USPC .......................................................... 709/224
See application file for complete search history.

(56) References Cited

U.S. PATENT DOCUMENTS

| | | | | |
|---|---|---|---|---|
| 2013/0059607 A1* | 3/2013 | Herz | ...................... | H04L 67/20 455/456.3 |
| 2014/0040374 A1* | 2/2014 | Olsen | .................... | H04L 67/306 709/204 |
| 2015/0248736 A1* | 9/2015 | Myslinski | .............. | G06Q 10/06 705/319 |
| 2015/0363694 A1* | 12/2015 | Banerjee | ............... | H04L 67/306 706/46 |
| 2017/0180937 A1* | 6/2017 | Vaccari | ................... | H04W 4/21 |

\* cited by examiner

*Primary Examiner* — Alan S Chou (74) *Attorney, Agent, or Firm* — Maschoff Brennan (57) ABSTRACT

Techniques for providing event driven notifications are disclosed. In one particular exemplary embodiment, the techniques may be realized as a method for providing event driven notifications comprising monitoring an electronic media feed for an event associated with a specified criteria, identifying, using at least one computer processor, a plurality of events in the electronic media feed, filtering the plurality of events, identifying an event of the plurality of events matching a specified location, and providing a notification associated with the identified event.

20 Claims, 4 Drawing Sheets

TECHNIQUES FOR PROVIDING EVENT DRIVEN NOTIFICATIONS

FIELD OF THE DISCLOSURE

The present disclosure relates generally to personal security and, more particularly, to techniques for providing event driven notifications.

BACKGROUND OF THE DISCLOSURE

The increasing number of media outlets makes it difficult if not impossible for a user to monitor all the outlets that may have news concerning their safety or well-being or that of friends or family in a timely manner. Additionally, major news outlets or traditional new outlets may not provide as much coverage as desired of violence or crime in an area of a particular individual. This may be the case if the violence or crime is not significant enough to gather attention from a traditional news outlet (e.g., it is overshadowed by other major media events or it is in an area overlooked by media). Such overlooked violence may however still present a significant risk to a particular individual. Social media may provide timely coverage of events affecting safety or well-being of an individual. However, identifying such notifications in a timely manner may be difficult given the volume of social media notifications (e.g., tweets, postings, blogs, etc.). Even if traditional media does cover an event that may affect safety or well-being of an individual, identifying the event in a timely manner allowing the individual to respond may be a challenge.

In view of the foregoing, it may be understood that there may be significant problems and shortcomings associated with current technologies relating to event driven notifications.

SUMMARY OF THE DISCLOSURE

Techniques for providing event driven notifications are disclosed. In one particular exemplary embodiment, the techniques may be realized as a method for providing event driven notifications comprising monitoring an electronic media feed for an event associated with a specified criteria, identifying, using at least one computer processor, a plurality of events in the electronic media feed, filtering the plurality of events, identifying an event of the plurality of events matching a specified location, and providing a notification associated with the identified event.

In accordance with other aspects of this particular exemplary embodiment, the notification may be placed in a queue for access by a user.

In accordance with further aspects of this particular exemplary embodiment, the notification may be sent to a user.

In accordance with additional aspects of this particular exemplary embodiment, the specified criteria may comprise a keyword associated with danger.

In accordance with additional aspects of this particular exemplary embodiment, the danger may comprise at least one of: weather related danger, crime related danger, violence related danger, and danger associated with a natural disaster.

In accordance with additional aspects of this particular exemplary embodiment, the location may comprises a current location of a specified device.

In accordance with further aspects of this particular exemplary embodiment, the location may comprise a location of a user, a friend of a user, or a family member of a user.

In accordance with other aspects of this particular exemplary embodiment, the location may comprise a location of interest associated with a device identified by determining at least one of: the device has been present in the location beyond a specified time threshold; the device has been present in a location more than a specified number of times; and the device is within a specified proximity of a location.

In accordance with additional aspects of this particular exemplary embodiment, the location may be specified by a user.

In accordance with other aspects of this particular exemplary embodiment, the location may be a location in a direction of travel of a device.

In accordance with further aspects of this particular exemplary embodiment, filtering the plurality of events may comprise filtering using text classification.

In accordance with additional aspects of this particular exemplary embodiment, filtering the plurality of events may comprise filtering using semantic word disambiguation.

In accordance with other aspects of this particular exemplary embodiment, identifying an event of the plurality of events matching a specified location may comprise identifying a location associated with the event using named entity recognition.

In accordance with further aspects of this particular exemplary embodiment, the electronic media feed may comprise an electronic media feed from a news outlet.

In accordance with additional aspects of this particular exemplary embodiment, the electronic media feed may comprise an electronic media feed from a social media outlet.

In accordance with other aspects of this particular exemplary embodiment, the notification may comprise an user interface control for providing feedback on the notification.

In accordance with further aspects of this particular exemplary embodiment, feedback on the notification may be used to provide at least one of: an indication of a level of accuracy in identifying an event matching a specified criteria; a level of accuracy in identifying an event matching a specified location; a level of accuracy in filtering the plurality of events; an indication of a quality of an electronic media feed; and a preference of a user.

In accordance with additional aspects of this particular exemplary embodiment, the techniques may comprise at least one non-transitory processor readable storage medium for storing a computer program of instructions configured to be readable by at least one processor for instructing the at least one processor to execute a computer process.

In another particular exemplary embodiment, the techniques may be realized as an article of manufacture for providing event driven notifications. The article of manufacture may comprise at least one non-transitory processor readable storage medium, and instructions stored on the at least one medium. The instructions may be configured to be readable from the at least one medium by at least one processor and thereby cause the at least one processor to operate so as to monitor an electronic media feed for events associated with a specified criteria, identify a plurality of events in the electronic media feed, filter the plurality of events, identify an event of the plurality of events matching a specified location, and provide a notification associated with the identified event.

In yet another particular exemplary embodiment, the techniques may be realized as a system for providing event driven notifications comprising one or more processors communicatively coupled to a network. The one or more processors may be configured to monitor an electronic media feed for events associated with a specified criteria, identify a plurality of events in the electronic media feed, filter the plurality of events, identify an event of the plurality of events matching a specified location, and provide a notification associated with the identified event.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
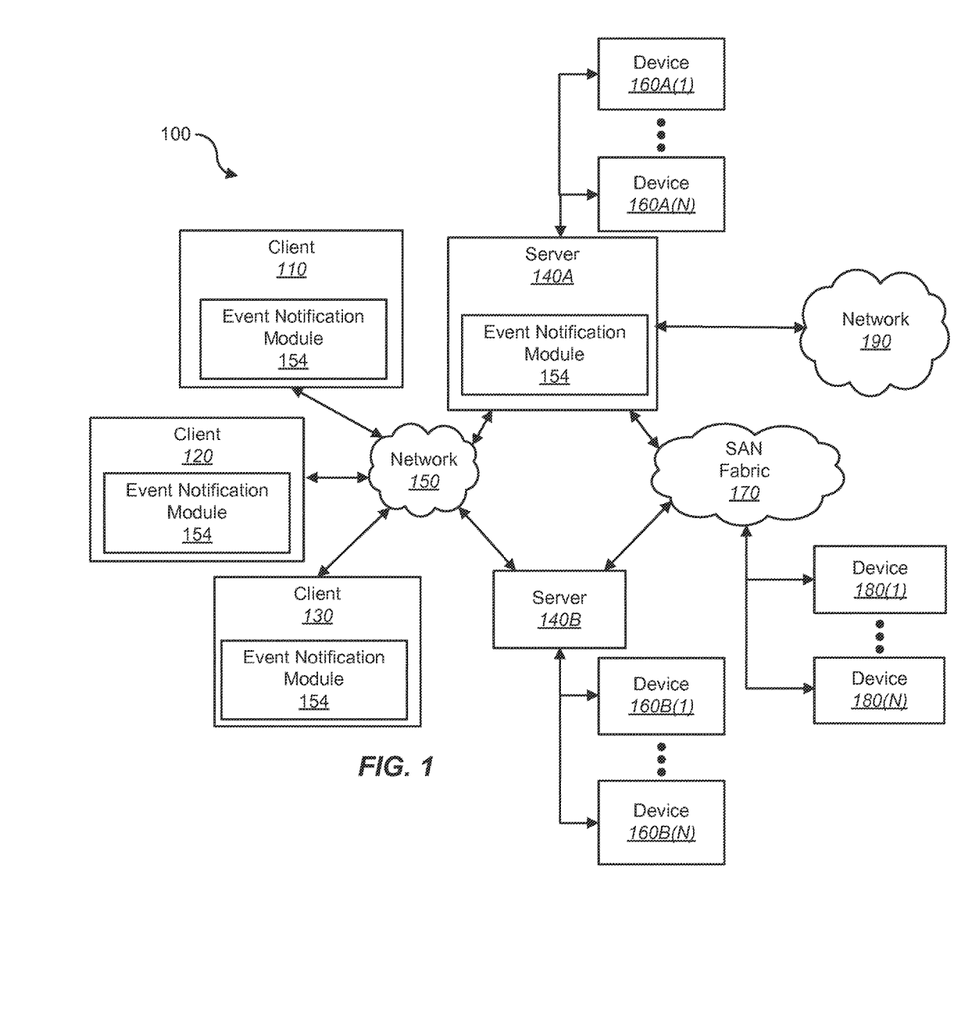
FIG. 1 shows a block diagram depicting a network architecture for providing event driven notifications in accordance with an embodiment of the present disclosure.

FIG. 1 shows a block diagram depicting a network architecture 100 for providing event driven notifications in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A (1)-(N), and server 140B may be communicatively coupled to storage devices 160B(1)-(N). Servers 140A and 140B may contain a management module (e.g., event notification module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
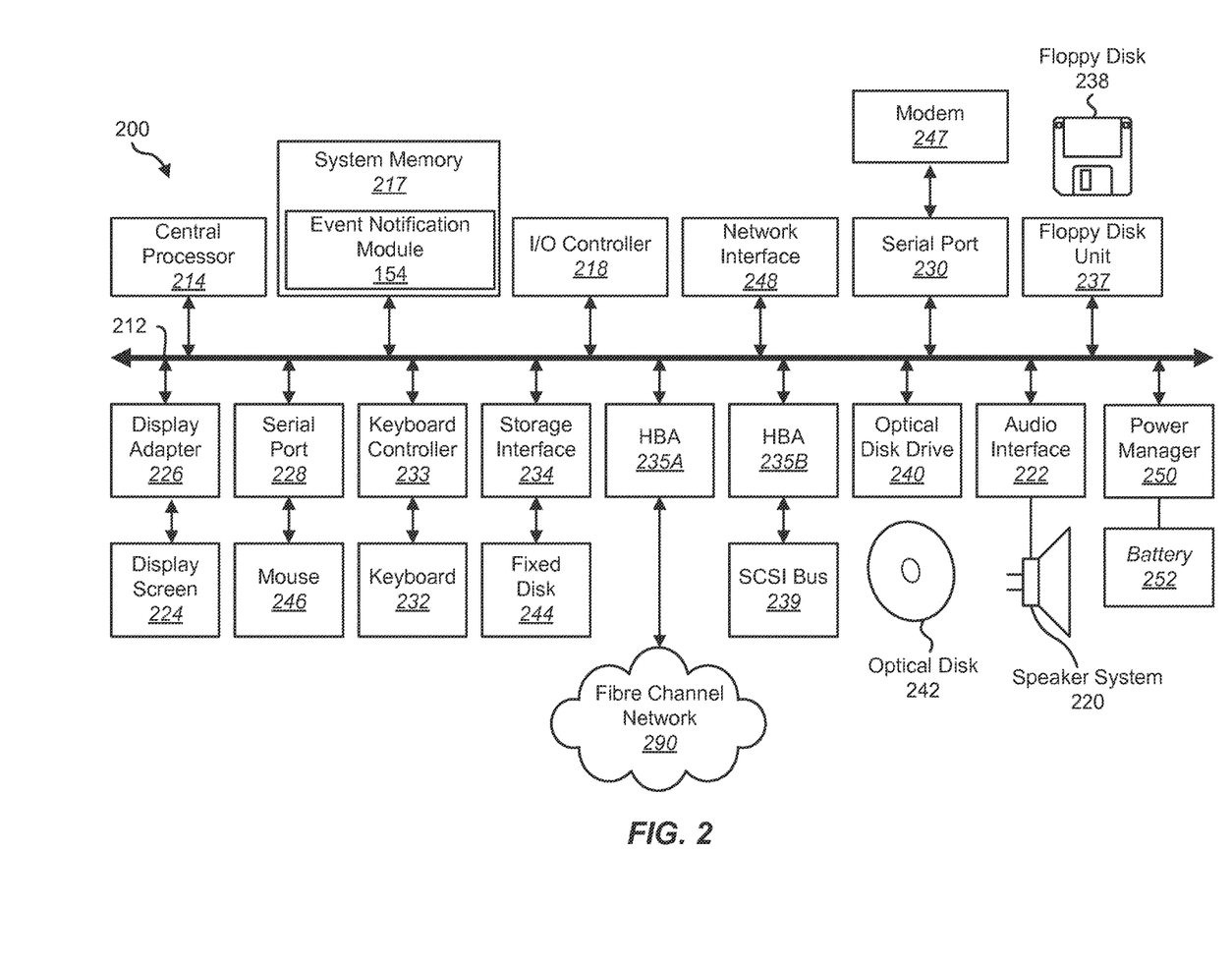
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180 (1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, data mining, notifications, and/or storage. According to some embodiments, servers 140A and 140B may be platforms used for caching, analyzing, backing up and/or archiving data. One or more portions of data may be cached, analyzed, backed up or archived based on a backup policy and/or an archive applied, attributes associated with the data source, space available for backup, space available at the data source, or other factors.

According to some embodiments, clients 110, 120, and/or 130 may contain one or more portions of software for providing event driven notifications such as, for example, event notification module 154. As illustrated, one or more portions of event notification module 154 may reside at a network centric location. For example, server 140A may be a server, a firewall, a gateway, or other network element that may perform one or more actions to identify events in electronic media feeds and provide notifications. According to some embodiments, network 190 may be an external network (e.g., the Internet) and server 140A may be a gateway or firewall between one or more internal components and clients and the external network.

Event notification module 154 may provide a user interface allowing a user to specify criteria for notifications. For example, a user may specify criteria describing types of notifications that are of interest to them (e.g., violence including perhaps a type of violence (assault, robbery, rape, murder, etc.), fire, severe weather, earthquake, etc.). Other criteria may be specified such as, for example, a time range, whether a perpetrator has been caught, whether events are single or serial events, etc. Event types may be specified individually for different devices and/or locations.

Event notification module 154 may allow a user to create an account to store criteria as well as areas to monitor. Locations or areas to monitor may include a location specified by a user (e.g., home, office, school, commuting route, etc.). A user interface of event notification module 154 can provide suggestions of locations upon activating an account.

In some embodiments, social network profile information can be used to quickly extract meaningful locations for that user. For example, named entity recognition may be used to recognize locations associated with a user's Facebook, LinkedIn, Twitter, or other accounts. In some embodiments, metadata may be extracted to determine locations (e.g., Exchangeable image file format (Exif) data associated with a Flickr account, a photo stream, etc.)

Event notification module 154 may also monitor locations associated with a mobile device (e.g., a cell phone, laptop, personal digital assistant, a tablet, and an e-reader) or a non-mobile device (e.g., a desktop computer). In some embodiments, event notification module 154 may receive location data from a mobile device and may determine a location of interest by one or more methods. For example, event notification module 154 may identify a location of interest by determining whether a device has been present in a location beyond a specified time threshold, whether device has been present in a location more than a specified number of times; and the device is within a specified proximity of a location. A user may specify one or more parameters of determining whether or not to monitor a location of interest (e.g., whether to use a location of interest identified by a particular algorithm, an expiration time to stop monitoring a location of interest after a device has left the location without a return visit, etc.).

In some embodiments, one or more portions of event notification module 154 may be an agent installed in a mobile device (e.g., clients 110, 120, and 130). One or more portions of event notification module 154 may be installed at a central location or may be distributed across multiple network elements (e.g., servers 140). For example, client software can periodically poll the location of the device. In turn, the client can resolve the city or town. The software can then include locations of interests for people protected by an account by finding those locations that occur statistically more often than other locations (or the sole location of the device if the device is a computer). Any statistical technique that allows for comparison of quantities of discrete variables (i.e. locations) may suffice for determining what locations to include automatically. In some embodiments, client software on a device (e.g. mobile, laptop, computer) may connect the device to a monitoring server and may associate the end point (device) with an account. In case an alert is found for a location of interest for a user, a device may receive an alert either by the client polling for the alert (using the account to identify locations of interest) or receiving the alert via a publish-subscribe pattern, such as pubsubhubbub.

In some embodiments, a user may specify (e.g., via a user interface of event notification module 154) locations to monitor for events. Locations specified by a user may include locations of friends, family members, spouses, etc. In some embodiments, a user may indicate other devices whose corresponding locations should be monitored for events (e.g., minors, elderly, spouse, etc.) Devices may be specified by indicating a device by phone number, associated user, or a mobile equipment identifier. According to some embodiments, a user may download or install a client on devices to be monitored (e.g., family members, employee work issued mobile devices, etc.) and devices may be registered with a service. A user may then specify which devices should receive notifications.

Event notification module 154 may allow a user to specify a proximity, a range, a circumference or other indicator to determine how to rank or whether to track an event based on a distance from a specified location and/or a direction of current or planned travel. A distance from a location to monitor may depend on a type of event or a severity of an event. In some embodiments, commuting or travel routes and times or ranges may be tracked. Thus, even if a device is not currently in an area but a user is scheduled to or typically commutes through an area, they may be alerted before their commute begins. A sensitivity to an event may depend on a commute mode or type (e.g., an assault may be ranked higher if a commute is by foot or bike than by car on a highway in the area).

Event notification module 154 may collect data from news and social media outlets. Event notification module 154 may also collect data from other outlets from other sources (e.g., governmental sources (police, fire, weather, natural disasters, etc.), radio, television, etc.).

Event notification module 154 may monitor social media and networks for events that may indicate an event with serious consequences is occurring at a given location. Event notification module 154 may have one or more components. For example, a first component may be search functionality. One or more methods may be used for searching. One method may be to manually identify existing news feeds that are reliable and trustworthy (e.g. ABC news) and pull content (e.g., all content, content limited by a specified parameter, content within a specified time range, etc.). A second search method may include querying social networks and feeds for keywords related to emergency events.

In some embodiments, keyword search of social media or other feeds may include a text collection of events published through social networks (e.g. tweets on Twitter). This may allow development of a vocabulary in which the words used to describe these events occur with greater frequency than in normal usage (using some preexisting source for baseline term frequency). Selection of these terms can be driven using simple statistical proportionality tests. With these keywords, event notification module 154 may search social networks and feeds using APIs to only narrow on posts and updates containing these words (e.g. Twitter's search API).

Event notification module 154 may filter social network data or other feed data (e.g., posts, updates, and tweets) to find those that do indeed contain an emergency alert. In one or more embodiments, event notification module 154 may use text classification and semantic word disambiguation techniques to identify those posts with relevant alerts for users' physical safety. Text classification and semantic word disambiguation techniques performed by event notification module 154 may include regular expression matching or more sophisticated approaches such as machine learning. For example, event notification module 154 may include a trained support vector machine which was trained on a data set containing messages of interest and messages not of interest. Methods used for classification may be selected and adjusted in order to find a tradeoff between detection and false positives that is appropriate for an audience.

In some embodiments, false hits, disreputable feeds or sources, and other filtering criteria may be maintained as a list, database, or other data structure. For example, a gaming site that contains descriptions of gunfire or other violence may be filtered out. Patterns associated with such sites or feeds may be recognized and utilized for filtering (e.g., keywords for filtering may include "frag" which may be used with shooting in games and not actual violence). In some embodiments, a threshold may be set based on a perceived relevance or accuracy. The threshold may be user or administrator configurable and it may determine whether an event is forwarded on as a notification.

After event notification module 154 has filtered social media and/or other news feed data to identify events concerning those which may impact safety (e.g., alerts and warnings) further processing may occur. In some embodiments, event notification module 154 may perform one or more techniques to identify a location where an event is taking place or has occurred. For example, event notification module 154 may use metadata associated with feed data (e.g., a post) and/or content and apply named entity recognition. Named Entity Recognition is a natural language processing technique that may identify which words represent a person, place or thing. Event notification module 154 may use named entity recognition to identify a location.

After locations are identified, event notification module 154 may generate notifications. In some embodiments, devices may poll a server and periodically pull down events by location and or other classifications. In some embodiments, notifications may be placed in a queue (e.g., by location) and routed to a device. For example, a publish-subscribe pattern may be employed, and alerts may be pushed to the device (e.g., via pubsubhubbub).

On the device, event notification module 154 may display an alert, update, or notification (e.g., using the standard pop up for that platform). For example, on the iPhone, alerts may be displayed on a lock screen or at the top of the screen if the device is engaged by the user. Alerts may be presented in such a fashion to draw the attention of the user quickly. In some embodiments, a notification may include an estimated accuracy, a location of an event (e.g., a street address, coordinates, and/or a distance from a current or anticipated device location). In some embodiments, a notification may contain a wrapper, a link, or a frame presenting an alert. A notification may simply point to or contain an original source of content (e.g., a tweet or posting containing the information). This may allow a user to see a context of the warning and judge its accuracy, applicability, timeliness, etc. It may also allow a user to follow a thread of conversation, go directly to a source for updates, or otherwise follow-up. A user may also forward, share, or otherwise alert others after receiving a notification. For example, event notification module 154 may integrate, interface with, or contain messaging, email, contacts, telephony, video telephony, and/or other communications components. Event notification module 154 may provide a link, button, or other user interface control on a notification allowing a user to share a notification or contact another individual about a notification. For notifications based on a location of a different user's device or location (e.g., a spouse, a child, etc.) event notification module 154 may provide easy access to contact the person associated with the notification location. For example, if a parent receives notifications about a location of their child's school, they may be prompted with or have easy access to a contact number for the school or their child. In some embodiments, a notification may extract one or more portions of content to provide it in a more readily accessible or easier format for a user. In some embodiments, notifications may have levels of severity or urgency which may be based on content, metadata, relevance, calculated accuracy, user preferences, a distance to a current location of a monitored device, and/or other factors.

A notification may also contain a control (e.g., an icon, button, link or other input) allowing a user to provide input. This may allow a user to provide feedback on the accuracy of a notification. Event notification module 154 may use feedback to judge accuracy and adjust an algorithm for filtering, sorting, user preferences, etc. Feedback may also allow event notification module 154 to rate a source of data.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, event notification module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
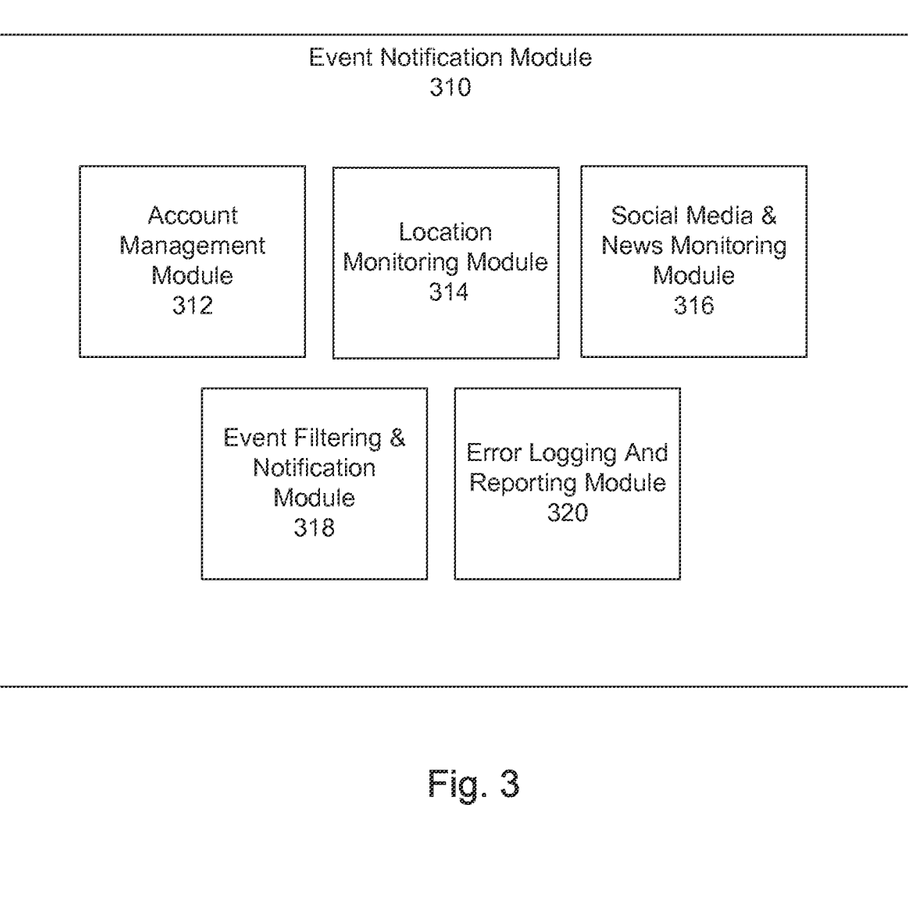
FIG. 3 shows a module for providing event driven notifications in accordance with an embodiment of the present disclosure.

Referring to FIG. 3, there is shown an event notification module 310 in accordance with an embodiment of the present disclosure. As illustrated, the event notification module 310 may contain one or more components including account management module 312, location monitoring module 314, social media & news monitoring module 316, event identification module 318, event filtering & notification module 320, and error logging and reporting module 322.

The description below describes network elements, computers, and/or components of a system and method for providing event driven notifications that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Account management module 312 may provide a user interface and functionality for creation and management of user accounts. Account management module 312 may allow a user to create an account, register, identify locations to be monitored, and/or set preferences. Locations specified by a user may include locations of friends, family members, spouses, etc. In some embodiments, a user may indicate other devices whose corresponding locations should be monitored for events (e.g., minors, elderly, spouse, etc.) Account management module 312 may allow a user to specify a proximity, a range, a circumference or other indicator to determine how to rank or whether to track an event based on a distance from a specified location and/or a direction of current or planned travel. A distance from a location to monitor may depend on a type of event or a severity of an event. In some embodiments, commuting or travel routes and times or ranges may be tracked. A user may also specify one or more time/date ranges for a location (e.g., a week they are at a particular location for vacation or a business trip, a range of time they are at an appointment, a time range for they are at their office, a reoccurring period at a location, etc.).

Location monitoring module 314 may identify, extract, and/or monitor locations of users. In some embodiments, social network profile information can be used to quickly extract meaningful locations for that user. For example, named entity recognition may be used to recognize locations associated with a user's Facebook, LinkedIn, Twitter, or other accounts. In some embodiments, metadata may be extracted to determine locations (e.g., Exchangeable image file format (Exif) data associated with a Flickr account, a photo stream, etc.).

Location monitoring module 314 may also monitor locations associated with a mobile device (e.g., a cell phone, laptop, personal digital assistant, a tablet, and an e-reader) or a non-mobile device (e.g., a desktop computer). In some embodiments, location monitoring module 314 may receive location data from a mobile device, a server, or other device, and may determine a location of interest by one or more methods. For example, location monitoring module 314 may identify a location of interest by determining whether a device has been present in a location beyond a specified time threshold, whether device has been present in a location more than a specified number of times, and the device is within a specified proximity of a location. A user may specify one or more parameters of determining whether or not to monitor a location of interest (e.g., whether to use a location of interest identified by a particular algorithm, an expiration time to stop monitoring a location of interest after a device has left the location without a return visit, etc.).

Social media & news monitoring module 316 may monitor social media and networks for events that may indicate an event with serious consequences is occurring at a given location. Social media & news monitoring module 316 may have one or more components. For example, a first component may be search functionality. One or more methods may be used for searching. One method may be to manually identify existing news feeds that are reliable and trustworthy (e.g. ABC news or other major network news) and pull content (e.g., all content, content limited by a specified parameter, content within a specified time range, etc.). A second search method may include querying social networks and feeds for keywords related to emergency events.

In some embodiments, keyword search of social media or other feeds may include a text collection of events published through social networks (e.g. tweets on Twitter). This may allow development of a vocabulary in which the words used to describe these events occur with greater frequency than in normal usage (using some preexisting source for baseline term frequency). Selection of these terms can be driven using simple statistical proportionality tests. With these keywords, social media & news monitoring module 316 may search social networks and feeds using APIs to only narrow on posts and updates containing these words (e.g. Twitter's search API).

Event filtering & notification module 318 may filter social network data or other feed data (e.g., posts, updates, and tweets) to find those that do indeed contain an emergency alert. In one or more embodiments, event filtering & notification module 318 may use text classification and semantic word disambiguation techniques to identify those posts with relevant alerts for users' physical safety. Text classification and semantic word disambiguation techniques performed by event filtering & notification module 318 may include regular expression matching or more sophisticated approaches such as machine learning. For example, event filtering & notification module 318 may include a trained support vector machine which was trained on a data set containing messages of interest and messages not of interest. In some embodiments, a trained support vector machine may be trained in a semi-supervised manner. For example, a support vector machine may be trained using a small amount of labelled data in conjunction with a large amount of unlabeled data to improve the training process. Feedback may be solicited from experts (e.g., at a service or solution provider) and/or feedback may be obtained from users (e.g., via a prompt provided with a notification). In some embodiments, the feedback may be used to provide labelled data for training a support vector machine. Methods used for classification may be selected and adjusted in order to find a tradeoff between detection and false positives that is appropriate for an audience.

In some embodiments, false hits, disreputable feeds or sources, and other filtering criteria may be maintained as a list, database, or other data structure. For example, a gaming site that contains descriptions of gunfire or other violence may be filtered out. Patterns associated with such sites or feeds may be recognized and utilized for filtering (e.g., keywords for filtering may include "frag" which may be used with shooting in games and not actual violence). In some embodiments, a threshold may be set based on a perceived relevance or accuracy. The threshold may be user or administrator configurable and it may determine whether an event is forwarded on as a notification.

In some embodiments, devices may poll a server and periodically pull down events by location and or other classifications. In some embodiments, notifications may be placed in a queue (e.g., by location) and routed to a device. For example, a publish-subscribe pattern may be employed, and alerts may be pushed to the device (e.g., via pubsubhubbub).

On the device, event filtering & notification module 318 may display an alert, update, or notification (e.g., using the standard pop up for that platform). For example, on the iPhone, alerts may be displayed on a lock screen or at the top of the screen if the device is engaged by the user. Alerts may be presented in such a fashion to draw the attention of the user quickly. In some embodiments, a notification may include an estimated accuracy, a location of an event (e.g., a street address, coordinates, and/or a distance from a current or anticipated device location). In some embodiments, a notification may contain a wrapper, a link, or a frame presenting an alert. A notification may simply point to or contain an original source of content (e.g., a tweet or posting containing the information).

Error logging and reporting module 320 may produce logs, reports, or other information associated with event driven notifications.

Figure 4:
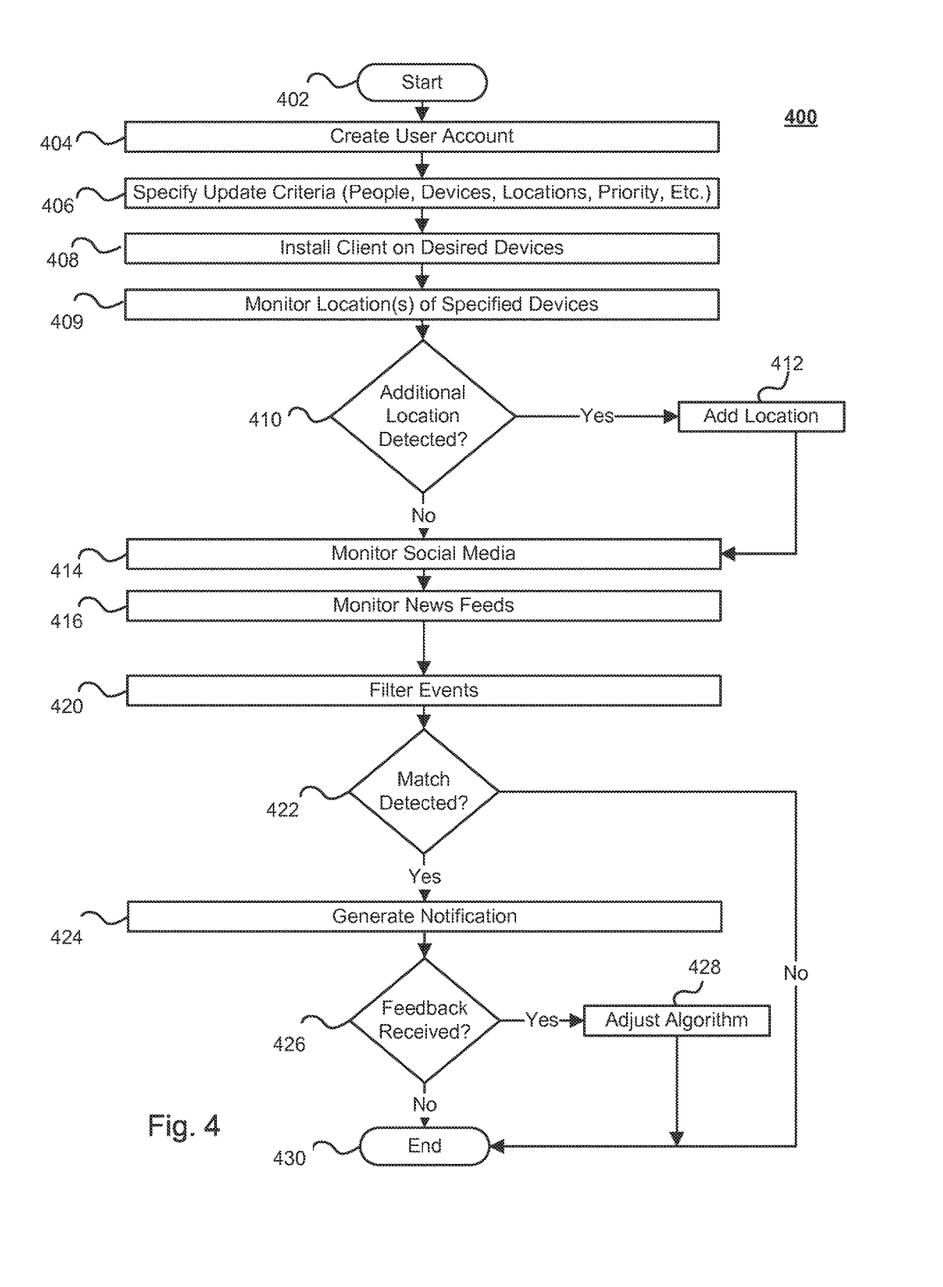
FIG. 4 depicts a method for providing event driven notifications in accordance with an embodiment of the present disclosure.

Referring to FIG. 4, there is depicted a method 400 for providing event driven notifications in accordance with an embodiment of the present disclosure. At block 402, the method 400 may begin.

At block 404, a user account may be created. A user may create an account and in some embodiments, register one or more devices or provide other information.

At block 406 preferences for notifications or updates may be specified. Preferences may include locations to monitor, devices to monitor, event types priorities (e.g., ranking acts of violence in a nearby location high, ranking severe weather lower, etc.), a proximity to monitor (e.g., maximum distance from a monitored location for which a user will be notified of an event), notification style (delivery mechanisms such as alert on mobile device, alert on multiple devices, sounds, displays, calls, messaging, etc.)

At block 408 a client may be installed on one or more devices. In some embodiments, location information may be received at a server and a majority of functionality or all functionality may be performed on a server.

At block 409 locations of one or more specified devices may be monitored. For example, a client on a mobile device may periodically send location information to a server process (e.g., GPS data, current connections of a Wi-Fi network with a known location, etc.).

At block 410 it may be determined whether additional locations have been detected. For example, a server, client, and/or distributed process or component may identify a location of interest by determining whether a device has been present in a location beyond a specified time threshold, whether device has been present in a location more than a specified number of times, and the device is within a specified proximity of a location. A user may specify one or more parameters of determining whether or not to monitor a location of interest.

At block 412, a location of interest may be added to a list, database, or other data structure storing account related information.

At blocks 414 and 416, social and news media may be monitored for events that may indicate an event with serious consequences is occurring at a given location. A first component may be search functionality. One or more methods may be used for searching. One method may be to manually identify existing news feeds that are reliable and trustworthy (e.g. ABC news or other major network news) and pull content (e.g., all content, content limited by a specified parameter, content within a specified time range, etc.). A second search method may include querying social networks and feeds for keywords related to emergency events.

In some embodiments, keyword search of social media or other feeds may include a text collection of events published through social networks (e.g. tweets on Twitter). This may allow development of a vocabulary in which the words used to describe these events occur with greater frequency than in normal usage (using some preexisting source for baseline term frequency). Selection of these terms can be driven using simple statistical proportionality tests. With these keywords, social media & news monitoring module 316 may search social networks and feeds using APIs to only narrow on posts and updates containing these words (e.g. Twitter's search API).

At block 420 one or more events identified by monitoring may be filtered to find those that do indeed contain an emergency alert. Filtering may use text classification and semantic word disambiguation techniques to identify the data with relevant alerts for users' physical safety. Text classification and semantic word disambiguation techniques may include regular expression matching or more sophisticated approaches such as machine learning. For example, a trained support vector machine which was trained on a data set containing messages of interest and messages not of interest may be used for event filtering. Methods used for classification may be selected and adjusted in order to find a tradeoff between detection and false positives that is appropriate for an audience.

In some embodiments, false hits, disreputable feeds or sources, and other filtering criteria may be maintained as a list, database, or other data structure. In some embodiments, a threshold may be set based on a perceived relevance or accuracy. The threshold may be user or administrator configurable and it may determine whether an event is forwarded on as a notification.

At block 422 it may be determined whether a match was found for a monitored location. If no match was detected the method may end at block 430. If a match was detected, a notification may be generated at block 424.

In some embodiments, devices may poll a server and periodically pull down events by location and or other classifications. In some embodiments, notifications may be placed in a queue (e.g., by location) and routed to a device. For example, a publish-subscribe pattern may be employed, and alerts may be pushed to the device (e.g., via pubsubhubbub).

On the device an alert, update, or notification may be displayed (e.g., using a standard pop up for that platform). For example, on the iPhone, alerts may be displayed on a lock screen or at the top of the screen if the device is engaged by the user. Alerts may be presented in such a fashion to draw the attention of the user quickly. In some embodiments, a notification may include an estimated accuracy, a location of an event (e.g., a street address, coordinates, and/or a distance from a current or anticipated device location). In some embodiments, a notification may contain a wrapper, a link, or a frame presenting an alert. A notification may simply point to or contain an original source of content (e.g., a tweet or posting containing the information). A notification may contain a link or other input control allowing a user to provide feedback.

At block 426 it may be determined whether feedback on a notification has been received. If feedback has been received, the method 400 may continue at block 428. If no feedback has been received the method may end at block 430.

At block 428, if feedback on a notification has been received one or more algorithms may be adjusted. Feedback may be used to judge accuracy or relevance of an update, alert, or notification and may be used to adjust an algorithm for filtering, sorting, user preferences, etc. Feedback may also allow event notification module 154 to rate a source of data.

At this point it should be noted that event driven notifications in accordance with the present disclosure as described above typically involves the processing of input data and the generation of output data to some extent. This input data processing and output data generation may be implemented in hardware or software. For example, specific electronic components may be employed in an event driven notification module or similar or related circuitry for implementing the functions associated with event driven notifications in accordance with the present disclosure as described above. Alternatively, one or more processors operating in accordance with instructions may implement the functions associated with event driven notifications in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for providing event driven notifications comprising:
   registering, via at least one computer processor, a mobile device with notification preferences;
   monitoring, via the at least one computer processor, locations of the registered mobile device;
   automatically determining, via the at least one computer processor, that the registered mobile device has been present in a particular location for a particular amount of time;
   automatically comparing, via the at least one computer processor, the particular amount of time to a specified time threshold;
   automatically determining, via the at least one computer processor and based on the comparison, that the registered mobile device has been present in the particular location longer than the specified time threshold;
   monitoring, via the at least one computer processor, an electronic media feed for events associated with a specified criteria based at least in part on the notification preferences and the particular location;
   identifying, via the at least one computer processor, a plurality of events in the electronic media feed;
   filtering, via the at least one computer processor, the plurality of events;
   identifying, via the at least one computer processor, an event of the plurality of events matching the particular location; and
   providing, via the at least one computer processor, a notification associated with the identified event to the registered mobile device in accordance with the notification preferences.

2. The method of claim 1, wherein the notification is placed in a queue for access by a user.

3. The method of claim 1, wherein the notification is sent to a user.

4. The method of claim 1, wherein the specified criteria comprises a keyword associated with danger.

5. The method of claim 4, wherein the danger comprises at least one of: weather related danger, crime related danger, violence related danger, and danger associated with a natural disaster.

6. The method of claim 1, wherein the particular location comprises a current location of the registered mobile device.

7. The method of claim 1, wherein the particular location comprises a current location of a user of the registered mobile device, a friend of the user, or a family member of the user.

8. The method of claim 1, wherein the particular location is in a current direction of travel of the registered mobile device.

9. The method of claim 1, wherein filtering the plurality of events comprises filtering using text classification.

10. The method of claim 1, wherein filtering the plurality of events comprises filtering using semantic word disambiguation.

11. The method of claim 1, wherein identifying an event of the plurality of events matching the particular location comprises identifying the event using named entity recognition.

12. The method of claim 1, wherein the electronic media feed comprises an electronic media feed from a news outlet.

13. The method of claim 1, wherein the electronic media feed comprises an electronic media feed from a social media outlet.

14. The method of claim 1, wherein the notification comprises a user interface control for providing feedback on the notification.

15. The method of claim 14, wherein feedback on the notification is used to provide at least one of: an indication of a level of accuracy in identifying an event matching the specified criteria; a level of accuracy in identifying an event matching the particular location; a level of accuracy in filtering the plurality of events; an indication of a quality of the electronic media feed; and a preference of a user.

16. At least one non-transitory computer processor readable storage medium for storing a computer program of instructions configured to be readable by at least one computer processor for instructing the at least one computer processor to execute a computer process for performing the method as recited in claim 1.

17. An article of manufacture for providing event driven notifications, the article of manufacture comprising:
at least one non-transitory computer processor readable storage medium; and
instructions stored on the at least one medium;
wherein the instructions are configured to be readable from the at least one medium by at least one computer processor and thereby cause the at least one computer processor to operate so as to:
register a first mobile device of a first user with notification preferences;
monitor locations of a second mobile device of a second user;
automatically determine that the second mobile device has been present in a particular location for a particular amount of time;
automatically compare the particular amount of time to a specified time threshold;
automatically determine, based on the comparison, that the second mobile device has been present in the particular location longer than the specified time threshold;
monitor an electronic media feed for events associated with a specified criteria based at least in part on the notification preferences and the particular location;
identify a plurality of events in the electronic media feed;
filter the plurality of events;
identify an event of the plurality of events matching the particular location; and
provide a notification associated with the identified event to the first mobile device in accordance with the notification preferences.

18. The article of manufacture of claim 17, wherein the second user is a friend of the first user or a family member of the first user.

19. A system for providing event driven notifications comprising:
at least one computer processor communicatively coupled to a network, wherein the at least one computer processor is configured to:
register a first mobile device of a first user with notification preferences;
monitor locations of a second mobile device of a second user;
automatically determine that the second mobile device has been present in a particular location a particular number of times;
automatically compare the particular number of times to a specified threshold number of times;
automatically determine, based on the comparison, that the registered mobile device has been present in the particular location more than the specified threshold number of times;
monitor an electronic media feed for events associated with a specified criteria based at least in part on the notification preferences and the particular location;
identify a plurality of events in the electronic media feed;
filter the plurality of events;
identify an event of the plurality of events matching the particular location; and
provide a notification associated with the identified event to the first mobile device in accordance with the notification preferences; and
at least one memory, coupled to the at least one computer processor, configured to provide the at least one computer processor with instructions.

20. The system of claim 19, wherein the second user is a friend of the first user or a family member of the first user.

* * * * *